United States Patent
Lau et al.

(10) Patent No.: US 6,898,211 B1
(45) Date of Patent: May 24, 2005

(54) SCHEME FOR MAINTAINING SYNCHRONIZATION IN AN INHERENTLY ASYNCHRONOUS SYSTEM

(75) Inventors: Onchuen D. Lau, Saratoga, CA (US); Frank Chui, Sunnyvale, CA (US); Gene Chui, Campbell, CA (US); Gary Kipnis, Sunnyvale, CA (US); Gurmohan Samrao, San Jose, CA (US); Neil King, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/334,693

(22) Filed: Jun. 16, 1999

(51) Int. Cl.[7] .................................................. H04J 3/06
(52) U.S. Cl. ........................................ 370/503; 375/354
(58) Field of Search ................................. 370/503, 518, 370/516, 517, 519; 375/354, 371, 373, 356

(56) References Cited

U.S. PATENT DOCUMENTS

| | | | | |
|---|---|---|---|---|
| 5,822,381 A | * | 10/1998 | Parry et al. ................. | 375/356 |
| 6,081,571 A | * | 6/2000 | Jansson ....................... | 375/376 |
| 6,128,318 A | * | 10/2000 | Sato ............................ | 370/503 |
| 6,208,626 B1 | * | 3/2001 | Brewer ........................ | 370/324 |
| 6,278,718 B1 | * | 8/2001 | Eschholz ..................... | 370/503 |
| 6,317,475 B1 | * | 11/2001 | Kasurinen ................... | 375/356 |

* cited by examiner

Primary Examiner—Frank Duong
Assistant Examiner—Melanie Jagannathan
(74) Attorney, Agent, or Firm—Blakely, Sokoloff, Taylor & Zafman LLP

(57) ABSTRACT

A synchronization state for a local clock generating circuit of a first of a number of components of a distributed system is maintained according to a number of local clock cycles recorded between successive occurrences of a global synchronization signal provided to the components within the distributed system. The local clock generating circuit may enters the synchronization state only after observing a predetermined number of occurrences of successive local clock cycles between instances of the global synchronization signal. The local clock generating circuit continues to provide local control signals for the first of the components at time instants corresponding to the number of local clock cycles even after an instance of the global synchronization signal is observed at a time instant corresponding to one local clock cycle more or less than the number of local clock cycles. However, the local clock generating circuit enters an alarm state when the global synchronization signal is observed at time instants corresponding to more than one local clock cycle more or less than the number of local clock cycles.

30 Claims, 4 Drawing Sheets

SCHEME FOR MAINTAINING SYNCHRONIZATION IN AN INHERENTLY ASYNCHRONOUS SYSTEM

FIELD OF THE INVENTION

The present invention relates to a scheme for synchronizing operations among distributed components of a digital system, for example an ATM switch, that are inherently asynchronous.

BACKGROUND

Many digital systems, for example ATM or other communication switches, are made up of a number of components that are physically located on different printed circuit (PC) boards. The boards are housed in a chassis and are interconnected to one another through signal paths that make up a backplane within the chassis. When the distances between the PC boards is small and/or the system is operated at low speed, it is relatively straight forward to maintain synchronization between the various components. For example, at low operating speeds, the skew among various components caused by relative differences in signal path lengths between the PC boards may cause operational problems. Then, as the PC boards become larger and/or as operating speed are increased, maintaining synchronization between the components becomes even more difficult and one cannot simply rely on trying to maintain equal signal path lengths. Moreover, if propagation delays along the signal path traces are long (e.g., so long as to exceed one clock period), additional operating problems may be encountered.

What is needed therefore, is a means for ensuring synchronization within an inherently asynchronous system such as a digital switch or other device that is made up of various components physically located on PC boards and the like.

SUMMARY OF THE INVENTION

In one embodiment, a synchronization state for a local clock generating circuit of a first of a number of components of a distributed system is maintained according to a number of local clock cycles recorded between successive occurrences of a global synchronization signal provided to the components within the distributed system. The local clock generating circuit may enter the synchronization state only after observing a predetermined number of occurrences of successive local clock cycles between instances of the global synchronization signal. Generally, the local clock generating circuit provides local control signals for the first of the components at time instants corresponding to the number of local clock cycles.

In the present scheme, the local clock generating circuit continues to provide local control signals for the first of the components at time instants corresponding to the number of local clock cycles even after an instance of the global synchronization signal is observed at a time instant corresponding to one local clock cycle more or less than the number of local clock cycles. However, the local clock generating circuit enters an alarm state when the global synchronization signal is observed at time instants corresponding to more than one local clock cycle more or less than the number of local clock cycles.

The local clock generating circuit may enter a missing clock state after an instance of the global synchronization signal is observed at a time instant corresponding to one local clock cycle less than the number of local clock cycles. From this state, the local clock generating circuit returns to the synchronization state after an instance of the global synchronization signal is observed at a time instant corresponding to one local clock cycle more than the number of local clock cycles. However, the local clock generating circuit enters the alarm state from the missing clock state after an instance of the global synchronization signal is observed at a time instant corresponding to two or more local clock cycles less than the number of local clock cycles.

The local clock generating circuit may also enter an extra clock state from the synchronization state after an instance of the global synchronization signal is observed at a time instant corresponding to one local clock cycle more than the number of local clock cycles. From this state, the local clock generating circuit returns to the synchronization state after an instance of the global synchronization signal is observed at a time instant corresponding to one local clock cycle less than the number of local clock cycles. However, the local clock generating circuit enters the alarm state from the extra clock state after an instance of the global synchronization signal is observed at a time instant corresponding to two or more local clock cycles more than the number of local clock cycles.

Other features and advantages of the present scheme will be apparent from the following discussion.

BRIEF DESCRIPTION OF THE DRAWINGS

The present invention is illustrated by way of example, and not limitation, in the figures of the accompanying drawings in which like reference numerals refer to similar elements and in which.

DETAILED DESCRIPTION

A scheme for maintaining synchronization among various components of an inherently asynchronous system such as a digital switch or other device that is made up of various components physically located on PC boards and the like is disclosed herein. Although discussed with reference to certain illustrated embodiments, upon review of this specification, those of ordinary skill in the art will recognize that the present scheme may find application in a variety of systems. Therefore, in the following description the illustrated embodiments should be regarded as exemplary only and should not be deemed to be limiting in scope.

Figure 1:
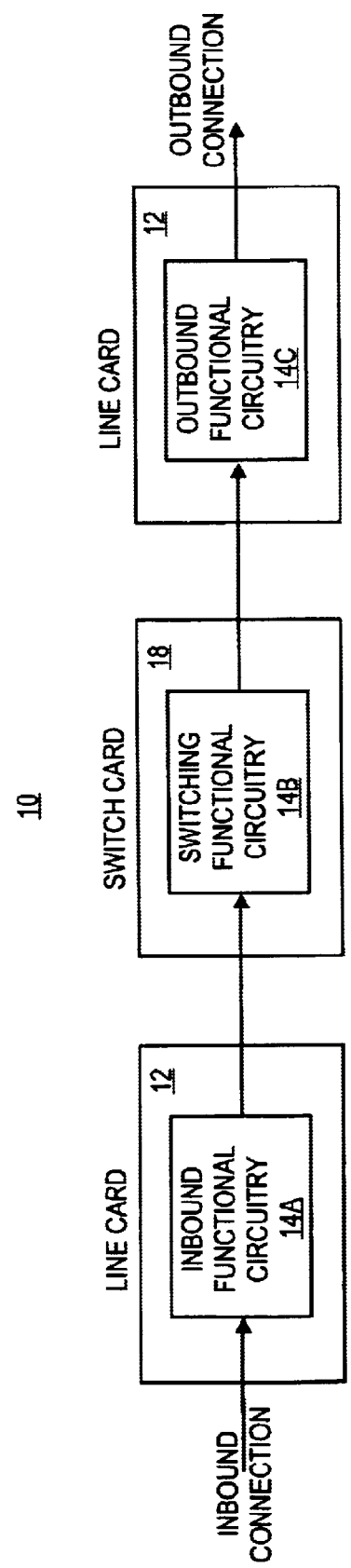
FIG. 1 illustrates an example of a communication switch within which the synchronization methodologies described herein may be practiced.

An example of one system within which the present synchronization scheme may be implemented is shown in FIG. 1. In the diagram, various components of a digital switch (e.g., an ATM or other communication switch) 10 are shown. In general, the switch 10 includes a number of interface or line cards 12, each or some of which may include functional circuitry blocks 14a–14c.

Figure 2:
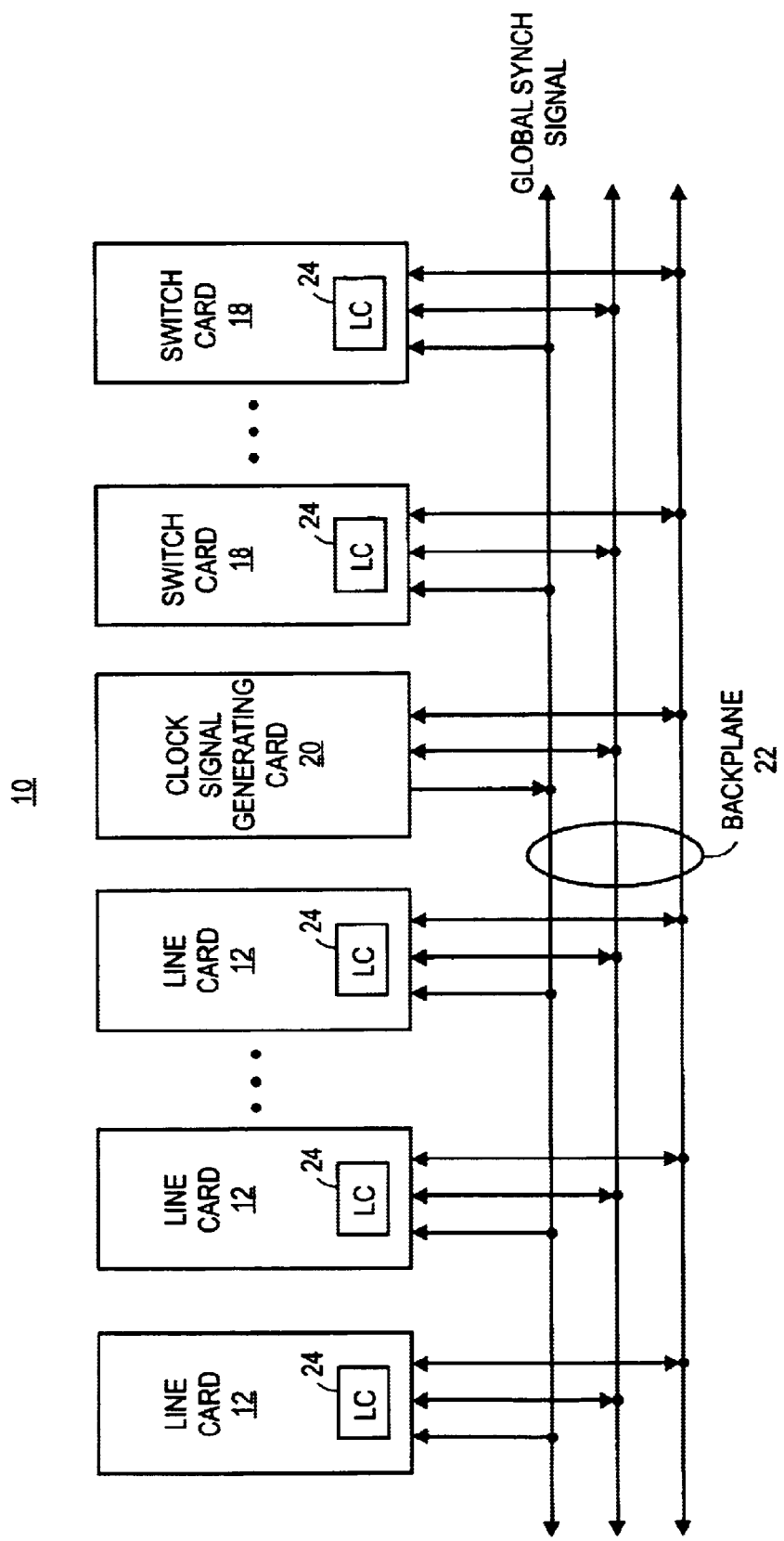
FIG. 2 illustrates an example of the physical layout the communication switch shown in FIG. 1.

While FIG. 1 illustrates the logical layout of switch 10, FIG. 2 illustrates its physical layout. As shown, switch 10 may include several line cards 12, each of which may be substantially similar and each of which may include both inbound and outbound functional circuitry blocks. One or more switch cards 18 may also be included within switch 10, each of which may be substantially similar to one another and each of which may include switching functional circuitry. Although not shown in this illustration, it is generally the case that any line card 12 may switch packets to any other line card 12 through any of the switch cards 18 using communication paths that interconnect these cards.

Also included in switch 10 is a control or clock signal generating card 20. Often, the clock signal generating card 20 will produce global clock signals and other control signals that are routed to the line cards 12 and the switch cards 18 across a backplane 22. Backplane 22 is thus made up of a number of communication signal paths and may also include the communication signal paths that transport the packets between the line cards 12 through the switch cards 18.

Where switch 10 does not operate at high speeds and/or where the distances across backplane 22 and/or the various cards of switch 10 are small, maintaining synchronization among the various operational components of the cards is relatively straightforward. As indicated above, such synchronization can usually be ensured by ensuring that the signal path lengths across backplane 22 are kept relatively uniform. However, as the physical distances across the backplane 22 increase (e.g., due to larger physical cards) and/or as the operation speed of switch 10 increases, ensuring synchronization becomes nontrivial. Simply relying on global signals produced by a control or clock signal generating card 20 is not sufficient, because those signals may not be received by each of line cards 12 and/or switch cards 18 at the same time instant. Any timing skews between the various cards can lead to operational problems for switch 10.

Rather than simply relying on such global clock signals, the present synchronization scheme employs both locally generated (i.e., on-card) clock signals as well as global synchronization signals. In brief, each card (e.g., line cards 12 and switch cards 18) maintains a local clock signal (e.g., as produced using a local clock (LC) circuit 24), which is used to control operations on that card. Further, a global synchronization signal that is generated by circuitry on the clock signal generating card 20 once every "n" clocks (i.e., once every "n" clock cycles of the local card clocks) is provided to the other cards (e.g., line cards 12 and switch cards 18) of switch 10 via backplane 22. By keeping track of where (i.e., at what time instant) the global synchronization signal is observed relative to the number of local clock cycles that have expired since the last occurrence thereof, each card of switch 12 can maintain synchronization to the other cards.

In one embodiment, each card (e.g., line cards 12 and switch cards 18) includes an LC circuit 24 that includes a local counter. The LC circuits 24 are used to generate local clock signals for their respective cards. Local circuitry for each card utilizes the local clock signals produced by the LC circuits 24 associated therewith. The counters of the various LC circuits 24 may be reset by a global synchronization (synch) signal transmitted from the clock signal generating card 24 across the backplane 22.

Figure 3:
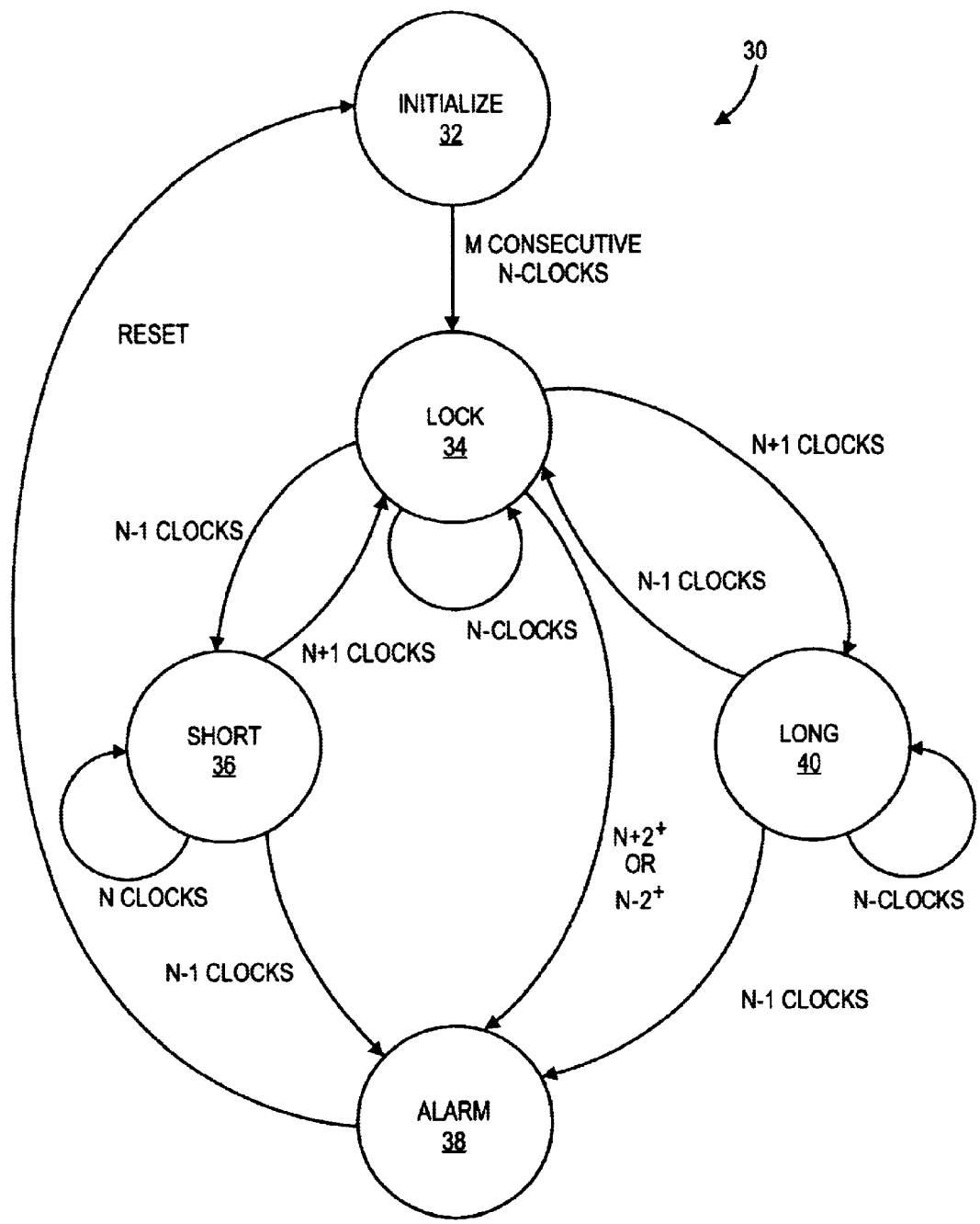
FIG. 3 is a state diagram for a local clock generating circuit configured in accordance with the present synchronization scheme.

As shown in FIG. 3, each LC circuit 24 is also operated under the control of a state machine 30. At the outset, the LC circuits 24 are in an initialization state 32. In this state, the LC circuits 24 count the number of successive occurrences of the global synchronization signal that are received at intervals of n local clock cycles. If "m" (e.g., m=8) consecutive occurrences of the global synchronization signal are observed at intervals of n (e.g., n=62) local clock cycles, then the LC circuit 24 enters a "locked" state 34. In general, n may correspond to the number of local clock signals between locally generated control signals for a card. The locked state 34 corresponds to a situation in which the LC circuit 24 is operating in synchronization with the LC circuits 24 of other cards in switch 10. As shown, for each occurrence of the global synchronization signal that is observed after n local clock cycles, the LC circuit 24 remains in the locked state 34.

Because of differing signal path lengths, temperature variations, process variations, and other operating conditions, it can be expected that, over time, an LC circuit 24 associated with a card of switch 10 may observe a global synchronization signal "early" or "late" with respect to the anticipated arrival at n clock cycles. For example, the global synchronization signal may be observed at n−1 clocks (early) or n+1 clocks (late).

Where the global synchronization signal is observed at n−1 clocks, the LC circuit 24 enters the "short" state 36. In this state, local control signals for the card are still generated once every n clock cycles. However, there exists a mismatch between the global synchronization signal and the local control signal. The LC circuit 24 will remain in the short state so long as successive occurrences of the global synchronization signal are observed at n clock cycles. If the "missing" clock cycle is observed, that is if the global synchronization signal is observed at n+1 clocks, the LC circuit returns to the locked state 34. If, however, the global synchronization signal is again observed at n−1 clocks, this is an indication that the LC circuit 24 has lost synchronization and the LC circuit 24 enters an alarm state 38.

From the locked state 34, if the global synchronization signal is observed at n+1 clocks, the LC circuit 24 enters a "long" state 40. In this state, local control signals for the card are still generated once every n clock cycles. However, there exists a mismatch between the global synchronization signal and the local control signal. The LC circuit 24 will remain in the long state so long as successive occurrences of the global synchronization signal are observed at n clock cycles. If the "extra" clock cycle is consumed, that is if the global synchronization signal is observed at n−1 clocks, the LC circuit returns to the locked state 34. If, however, the global synchronization signal is again observed at n+1 clocks, this is an indication that the LC circuit 24 has lost synchronization and the LC circuit 24 enters the alarm state 38.

Where more than a single clock cycle difference exists between the global synchronization signal and n occurrences of the local clock signal, that is an indication that the LC circuit has lost synchronization and the LC circuit 24 will enter alarm state 38. In this state, error flags may be set that can indicate a fault condition to other components of the card hosting the LC circuit 24. Local control signals may still be generated every n clocks, however, it is preferable that the error flags cause a local control processor to reset the LC circuit 24 to the initialization state 32, in an attempt to reacquire synchronization.

Figure 4:
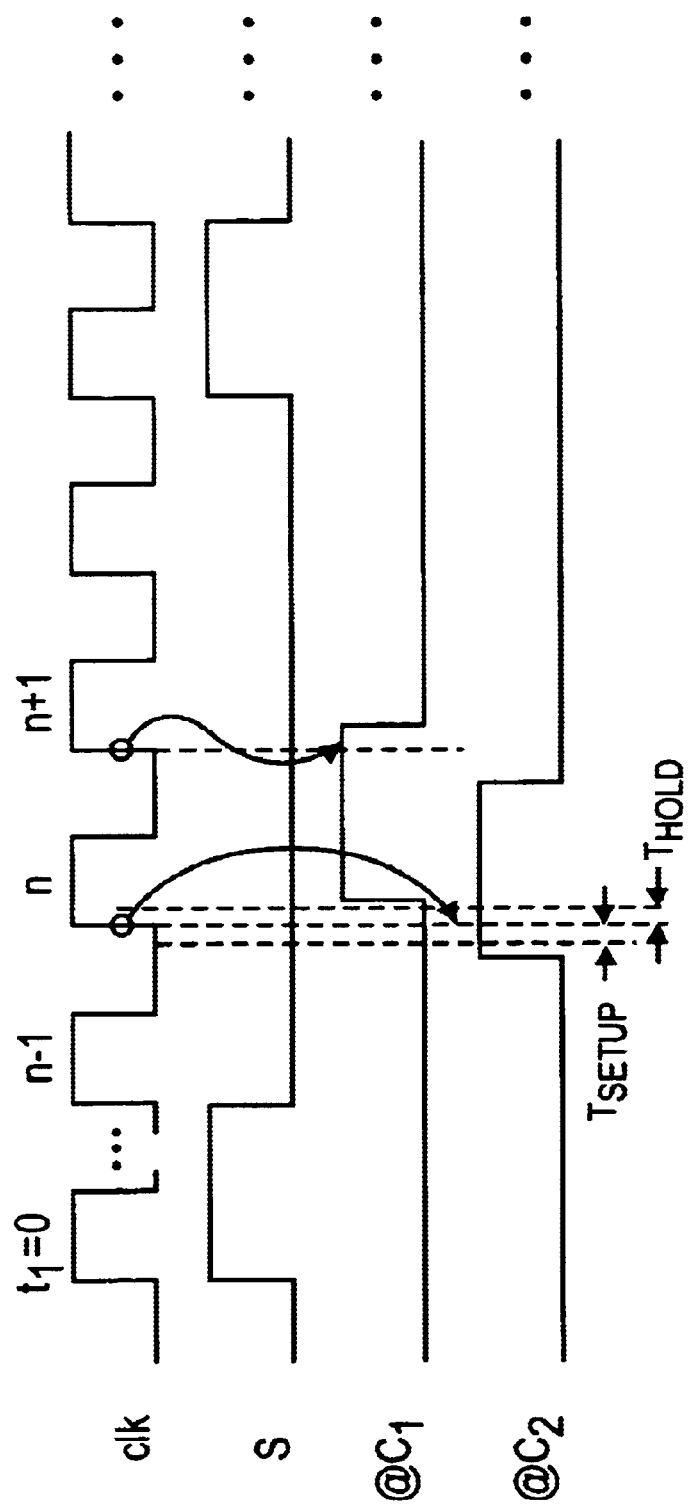
FIG. 4 illustrates an example of timing skews which may be compensated for using the present synchronizing scheme.

For sake of clarity, FIG. 4 shows an example of where a global synchronization signal (S) is observed at one card (C2) at a time corresponding to n local clock cycles, but is not observed at another card (C1) until n+1 local clock cycles. Assume cards C1 and C2 each include a local clock circuit that produces a clock signal substantially similar to that shown by signal clk. If at a time t=0, with respect to the signal clk, the global synchronization signal S is produced by a clock generating card, then that signal S will eventually propagate (e.g., across the backplane) to cards C1 and C2. However, because of the varying lengths of the communication signal paths between the cards, the signal S may be observed at different times at C1 and C2. For example, in the figure the signal S is observed (e.g., by latching the logic high value of signal S) at card C2 at a time corresponding to clock cycle n. That is, the signal S arrives a sufficient time ($t_{setup}$ or more) in advance of clock cycle n so that its logic high state is latched or otherwise captured on the rising edge of clk. However, the same signal S is not observed at card C1 until clock cycle n+1, because signal S does not arrive at C1 until a time $t_{hold}$ or more after the rising edge of clk at cycle n. Similar timing skews may cause signal S to be observed at a time corresponding to a clock cycle n−1.

The above synchronization scheme allows the various timing skews to be compensated for and allows synchronization to be maintained in systems such as switch 10 that tend to be inherently asynchronous because of the use of independent local clock signal generators (e.g., LC circuits 24).

Thus a scheme for maintaining synchronization among various components of an inherently asynchronous system such as a digital switch or other device that is made up of various components physically located on PC boards and the like has been described. Although the foregoing description and accompanying figures discuss and illustrate specific embodiments, it should be appreciated that the present invention is to be measured only in terms of the claims that follow.

What is claimed is:

1. A method for synchronizing a local clock generating circuit for a first of a plurality of components of a distributed system, the method comprising:

maintaining a locked state when a predefined number of local clock cycles generated by the local clock generating circuit is observed between successive occurrences of a global synchronization signal provided to each of the plurality of components of the distributed system;

entering a short state from the locked state when one less than the predefined number of local clock cycles is observed between successive occurrences of the global synchronization signal;

entering the locked state from the short state when one more than the predefined number of local clock cycles is observed between successive occurrences of the global synchronization signal;

entering an alarm state from the short state when one less than the predefined number of local clock cycles is observed between successive occurrences of the global synchronization signal;

entering a long state from the locked state when one more than the predefined number of local clock cycles is observed between successive occurrences of the global synchronization signal;

entering the locked state from the long state when one less than the predefined number of local clock cycles is observed between successive occurrences of the global synchronization signal; and entering the alarm state from the long state when one more than the predefined number of local clock cycles is observed between successive occurrences of the global synchronization signal.

2. The method of claim 1 further comprising observing the predefined number of local clock cycles between a second predefined number of successive occurrences of the global synchronization signal and then entering the locked state.

3. The method of claim 1 further comprising generating local control signals for the first of the plurality of components at time instants corresponding to the predefined number of local clock cycles.

4. The method of claim 1 further comprising entering the alarm state from the locked state when two more than the predefined number of local clock cycles is observed between successive occurrences of the global synchronization signal and entering the alarm state from the locked state when two less than the predefined number of local clock cycles is observed between successive occurrences of the global synchronization signal.

5. The method of claim 4 further comprising observing the predefined number of local clock cycles between a second predefined number of successive occurrences of the global synchronization signal and then entering the locked state from the alarm state.

6. The method of claim 4 further comprising suspending generation of local control signals for the first of the plurality of components when in the alarm state.

7. A local clock generating circuit for a first of a plurality of components of a distributed system, the local clock generating circuit comprising a state machine to perform operations comprising:

maintaining a locked state when a predefined number of local clock cycles generated by the local clock generating circuit is observed between successive occurrences of a global synchronization signal provided to each of the plurality of components of the distributed system;

entering a short state from the locked state when one less than the predefined number of local clock cycles is observed between successive occurrences of the global synchronization signal;

entering the locked state from the short state when one more than the predefined number of local clock cycles is observed between successive occurrences of the global synchronization signal;

entering an alarm state from the short state when one less than the predefined number of local clock cycles is observed between successive occurrences of the global synchronization signal;

entering a long state from the locked state when one more than the predefined number of local clock cycles is observed between successive occurrences of the global synchronization signal;

entering the locked state from the long state when one less than the predefined number of local clock cycles is observed between successive occurrences of the global synchronization signal; and entering the alarm state from the long state when one more than the predefined number of local clock cycles is observed between successive occurrences of the global synchronization signal.

8. The local clock generating circuit of claim 7 wherein the state machine is further to perform operations comprising observing the predefined number of local clock cycles between a second predefined number of successive occurrences of the global synchronization signal and then entering the locked state.

9. The local clock generating circuit of claim 7 further comprising a local control signal generator coupled to the state machine that generates local control signals at time instants corresponding to the predefined number of local clock cycles.

10. The local clock generating circuit of claim 7 wherein the state machine is further to perform operations comprising entering the alarm state from the locked state when two more than the predefined number of local clock cycles is observed between successive occurrences of the global synchronization signal and entering the alarm state from the locked state when two less than the predefined number of local clock cycles is observed between successive occurrences of the global synchronization signal.

11. The local clock generating circuit of claim 10 wherein the state machine is further to perform operations comprising observing the predefined number of local clock cycles between a second predefined number of successive occurrences of the global synchronization signal and then entering the locked state from the alarm state.

12. The local clock generating circuit of claim 10 wherein the local control signal generator suspends generation of local control signals for the first of the plurality of components when the state machine is in the alarm state.

13. A computer readable medium containing executable instructions which, when executed in a processing system, causes the processing system to perform a method comprising:

maintaining a locked state when a predefined number of local clock cycles generated by the local clock generating circuit is observed between successive occurrences of a global synchronization signal provided to each of the plurality of components of the distributed system;

entering a short state from the locked state when one less than the predefined number of local clock cycles is observed between successive occurrences of the global synchronization signal;

entering the locked state from the short state when one more than the predefined number of local clock cycles is observed between successive occurrences of the global synchronization signal;

entering an alarm state from the short state when one less than the predefined number of local clock cycles is observed between successive occurrences of the global synchronization signal;

entering a long state from the locked state when one more than the predefined number of local clock cycles is observed between successive occurrences of the global synchronization signal;

entering the locked state from the long state when one less than the predefined number of local clock cycles is observed between successive occurrences of the global synchronization signal; and entering the alarm state from the long state when one more than the predefined number of local clock cycles is observed between successive occurrences of the global synchronization signal.

14. The computer readable medium of claim 13 causes the processing system to perform a method further comprising observing the predefined number of local clock cycles between a second predefined number of successive occurrences of the global synchronization signal and then entering the locked state.

15. The computer readable medium of claim 13 further comprising generating local control signals for the first of the plurality of components at time instants corresponding to the predefined number of local clock cycles.

16. The computer readable medium of claim 13 further comprising entering the alarm state from the locked state when two more than the predefined number of local clock cycles is observed between successive occurrences of the global synchronization signal and entering the alarm state from the locked state when two less than the predefined number of local clock cycles is observed between successive occurrences of the global synchronization signal.

17. The computer readable medium of claim 16 further comprising observing the predefined number of local clock cycles between a second predefined number of successive occurrences of the global synchronization signal and then entering the locked state from the alarm state.

18. The computer readable medium of claim 16 further comprising suspending generation of local control signals for the first of the plurality of components when in the alarm state.

19. A local clock generating circuit for a first of a plurality of components of a distributed system, the local clock generating circuit including a state machine comprising:

means for maintaining a locked state when a predefined number of local clock cycles generated by the local clock generating circuit is observed between successive occurrences of a global synchronization signal provided to each of the plurality of components of the distributed system;

means for entering a short state from the locked state when one less than the predefined number of local clock cycles is observed between successive occurrences of the global synchronization signal;

means for entering the locked state from the short state when one more than the predefined number of local clock cycles is observed between successive occurrences of the global synchronization signal;

means for entering an alarm state from the short state when one less than the predefined number of local clock cycles is observed between successive occurrences of the global synchronization signal;

means for entering a long state from the locked state when one more than the predefined number of local clock cycles is observed between successive occurrences of the global synchronization signal;

means for entering the locked state from the long state when one less than the predefined number of local clock cycles is observed between successive occurrences of the global synchronization signal; and means for entering the alarm state from the long state when one more than the predefined number of local clock cycles is observed between successive occurrences of the global synchronization signal.

20. The local clock generating circuit of claim 19 wherein the state machine further comprises means for observing the predefined number of local clock cycles between a second predefined number of successive occurrences of the global synchronization signal and then entering the locked state.

21. The local clock generating circuit of claim 19 wherein the state machine further comprises means for generating local control signals for the first of the plurality of components at time instants corresponding to the predefined number of local clock cycles.

22. The local clock generating circuit of claim 19 wherein the state machine further comprises means for entering the alarm state from the locked state when two more than the predefined number of local clock cycles is observed between successive occurrences of the global synchronization signal and means for entering the alarm state from the locked state when two less than the predefined number of local clock cycles is observed between successive occurrences of the global synchronization signal.

23. The local clock generating circuit of claim 22 wherein the state machine further comprises means for observing the predefined number of local clock cycles between a second predefined number of successive occurrences of the global synchronization signal and then entering the locked state from the alarm state.

24. The local clock generating circuit of claim 22 wherein the state machine further comprises means for suspending generation of local control signals for the first of the plurality of components when in the alarm state.

25. A distributed system having a plurality of components in which each of the plurality of components includes a local clock generating circuit with a state machine to perform operations comprising:

maintaining a locked state when a predefined number of local clock cycles generated by the local clock generating circuit is observed between successive occurrences of a global synchronization signal provided to each of the plurality of components of the distributed system;

entering a short state from the locked state when one less than the predefined number of local clock cycles is observed between successive occurrences of the global synchronization signal;

entering the locked state from the short state when one more than the predefined number of local clock cycles is observed between successive occurrences of the global synchronization signal;

entering an alarm state from the short state when one less than the predefined number of local clock cycles is observed between successive occurrences of the global synchronization signal;

entering a long state from the locked state when one more than the predefined number of local clock cycles is observed between successive occurrences of the global synchronization signal;

entering the locked state from the long state when one less than the predefined number of local clock cycles is observed between successive occurrences of the global synchronization signal; and entering the alarm state from the long state when one more than the predefined number of local clock cycles is observed between successive occurrences of the global synchronization signal.

26. The distributed system of claim 25 wherein the state machine is further to perform operations comprising observing the predefined number of local clock cycles between a second predefined number of successive occurrences of the global synchronization signal and then entering the locked state.

27. The distributed system of claim 25 further comprising a local control signal generator coupled to the state machine that generates local control signals at time instants corresponding to the predefined number of local clock cycles.

28. The distributed system of claim 25 wherein the state machine is further to perform operations comprising entering the alarm state from the locked state when two more than the predefined number of local clock cycles is observed between successive occurrences of the global synchronization signal and entering the alarm state from the locked state when two less than the predefined number of local clock cycles is observed between successive occurrences of the global synchronization signal.

29. The distributed system of claim 28 wherein the state machine is further to perform operations comprising observing the predefined number of local clock cycles between a second predefined number of successive occurrences of the global synchronization signal and then entering the locked state from the alarm state.

30. The distributed system of claim 28 wherein the local control signal generator suspends generation of local control signals for the first of the plurality of components when the state machine is in the alarm state.

* * * * *